US006823035B1

(12) United States Patent
Helmersson et al.

(10) Patent No.: US 6,823,035 B1
(45) Date of Patent: Nov. 23, 2004

(54) CONTROL ROD

(75) Inventors: Sture Helmersson, Kolbäck (SE); Örjan Bernander, Västerås (SE)

(73) Assignee: Westinghouse Atom AB, Vasteras (SE)

( * ) Notice: Subject to any disclaimer, the term of this patent is extended or adjusted under 35 U.S.C. 154(b) by 0 days.

(21) Appl. No.: 09/868,988

(22) PCT Filed: Dec. 6, 1999

(86) PCT No.: PCT/ES99/02268

§ 371 (c)(1),
(2), (4) Date: Nov. 8, 2001

(87) PCT Pub. No.: WO00/39808

PCT Pub. Date: Jul. 6, 2000

(30) Foreign Application Priority Data

Dec. 23, 1998 (SE) ............................................. 9804518

(51) Int. Cl.[7] ................................................ G21C 7/00
(52) U.S. Cl. ...................... 376/333; 376/327; 376/335
(58) Field of Search ................................ 376/333, 327, 376/335

(56) References Cited

U.S. PATENT DOCUMENTS

| | | | | |
|---|---|---|---|---|
| 4,451,428 A | * | 5/1984 | Nishimura et al. | ......... 376/333 |
| 4,610,893 A | * | 9/1986 | Eriksson et al. | ............ 427/446 |
| 4,752,440 A | * | 6/1988 | Ahlinder et al. | ............ 376/333 |
| 5,034,185 A | * | 7/1991 | Ueda et al. | .................. 376/333 |

FOREIGN PATENT DOCUMENTS

| | | |
|---|---|---|
| CH | 665046 | 4/1988 |
| JP | JO 1148-998 A | * 12/1987 |

OTHER PUBLICATIONS

Vesterlund et al., "Development of ABB control rods and operational experience," Kerntechnick 57 (1992), No. 2, pp. 102–106.*

* cited by examiner

Primary Examiner—Jack Keith
Assistant Examiner—R Palabrica
(74) Attorney, Agent, or Firm—Swidler Berlin Shereff Friedman, LLP

(57) ABSTRACT

A control rod (2) for boiling water reactor comprising four absorber blades (6, 7, 8, 9) which form an orthogonal cross with a cruciform centre (10). The width of the absorber blades coincides with the radial direction of the control rod and the length of the absorber blades coincides with the axial direction of the control rod. Each one of the absorber blades comprises an absorber material distributed in the longitudinal direction, whereby a mean value of the quantity of absorber material per unit of length of the control rod is smaller in the upper part of the control rod than in the lower part thereof. Each one of the absorber blades comprises in its upper part (15) an inner part arranged radially inside an outer part, where the outer part is provided with absorber material whereas the inner part lacks absorber material, whereby said inner part in at least some portion constitutes at least one-fourth of the width of the absorber blade.

12 Claims, 5 Drawing Sheets

CONTROL ROD

TECHNICAL FIELD

The present invention relates to a control rod for a boiling water reactor comprising four absorber blades forming an orthogonal cross. The absorber blades contain absorber material distributed in the longitudinal direction, a mean value of the quantity of absorber material per unit of length of the control rod being smaller in the upper part of the control rod than in the lower part thereof.

BACKGROUND ART

A core in a boiling water reactor normally comprises several hundred fuel assemblies. These are arranged vertically in the core and have an at least substantially square cross section. Each fuel assembly comprises a bundle of fuel rods. In boiling water reactors, fuel bundles containing 8×8, 9×9 or 10×10 fuel rods are often used. A fuel bundle is surrounded by a fuel channel. The fuel channel is open at both ends so as to allow the coolant of the reactor to flow through the fuel bundle. The core is immersed into water which serves both as coolant and as neutron moderator. Each fuel rod contains a large number of fuel pellets stacked on top of each other in a cladding tube.

A nuclear reactor also comprises a plurality of control rods, the primary task of which is to start, control and shut off the power generation by being inserted into and extracted from the reactor core. In the boiling water reactor, the control rods are inserted into the core from below. With the aid of a drive, the control rod may be operated in different positions between a fully extracted and a fully inserted position in the core. Certain of the control rods are extracted from the core during operation, whereas others are inserted to different levels. These levels vary during the operating cycle of the reactor. In the boiling water reactor, the control rods are composed of four vertically arranged elongated absorber blades, which together form an orthogonal cross. The absorber blades are generally of stainless steel and provided with a large number of bored holes or tubes filled with a neutron-absorbing material, for example boron carbide ($B_4C$) or hafnium. The absorber material is usually uniformly distributed in both the axial and radial directions in the absorber blades. The active length of the control rods, that is, the length of that part of the control rod which contains the absorber material, corresponds to the active height of the reactor core when the control rods are fully inserted into the core.

The fuel assemblies are arranged in a regular lattice, where each fuel assembly is included in two rows of fuel assemblies which are perpendicular to each other. The control rods are normally arranged with each one of their absorber blades between two fuel assemblies located in the same row, such that each control rod together with four fuel assemblies arranged around its blades form one unit.

The control rods in the reactor are usually divided into two groups with different tasks. One group of control rods is, during normal operation, fully extracted from the core and used only for stopping and starting the reactor. The other group is used for controlling the reactor power and for burnup compensation during normal reactor operation. The control rods in the second group will hereinafter be referred to as controlling rods. These controlling rods normally constitute less than 10% of all the control rods. At the beginning of an operating cycle, the controlling rods are inserted. By an operating cycle is meant the time between two refuellings. To compensate for the burnup of the fuel, the controlling rods are successively extracted during the operating cycle. The change of the positions of the controlling rods takes place at certain time intervals, for example once a week. The change may, for example, consist of the controlling rods being extracted about 8% of their lengths.

Currently, conventional control rods are used, with the absorber material uniformly distributed in the absorber blades, in both groups of control rods. During the time when the controlling rods are inserted, those fuel pellets which are located adjacent to the absorber blades are protected from burnup of fissile material. This leads to a situation where, each time the controlling rod is extracted a certain distance, fuel pellets containing high contents of fissile material are exposed, resulting in a considerable increase in power in these fuel pellets. This local increase in power takes place very rapidly. Such stresses may in certain cases cause fuel failure, so-called PCI failure (PCI=pellet-clad interaction), on the cladding tube surrounding the fuel pellets. The fuel rods which are located nearest the cruciform centre of the controlling rod are particularly subjected to such stresses and hence run the greatest risk of fuel failure. The reason for this is that these fuel rods are protected against burnup of fissile material by two absorber blades.

According to one previous solution, a control rod is known which in its upper part if arranged with a smaller percentage of absorber material per unit of length than the rest of the control rod. In this way, part of the fissile material is burnt up during the time when the control rod is fully inserted into the core and the power increase is not equally great when the controlling rod is extracted. A reduced power increase when the controlling rod is extracted is achieved by arranging a larger number of bored channels perpendicular to the longitudinal direction of the control rod and filling them with a neutron-absorbing material, whereby the channels in the upper part of the control rod have a relatively smaller radius, whereby the length of the respective channel is considerably larger than its radius, whereas the other channels have a relatively larger radius.

One disadvantage of the above-mentioned control rod is that the reduction of the power increase obtained when the control rod is extracted is not sufficiently great to eliminate the risk of fuel failure on the most exposed fuel rods, that is the fuel rods situated nearest the cruciform centre of the control rod.

Another disadvantage is that the service life becomes shorter for the above-mentioned control rod than for conventional control rods. The service life of the absorber material, and hence the service life of the control rod, depend on the quantity of absorber material per unit of surface. For a cylindrical channel, the length of which is considerably larger than its radius, the service life of the absorber material is substantially influenced by its radius. A reduction of the diameters of the channels leads to a corresponding reduction of the service life of the control rod.

According to another previous solution, it is known to arrange a smaller quantity of absorber material in that part of the absorber blades which extends along the fuel rods located nearest to the cruciform center. In their outer part, the blades are provided with a larger number of channels, filled with absorber material, which extend perpendicular to the longitudinal direction of the control rod. In one embodiment, that part of the absorber blades which is located inside the filled channels lacks absorber material. The control rod is provided with recesses, which extend across the fuel rod located nearest the cruciform center.

These recesses are filled with moderator such that the consumption of fissile material in adjacent fuel rods increases. By arranging the absorber material in this way, it is possible to considerably extend the duration of an operating cycle for a reactor.

The disadvantage of using such a control rod as a controlling rod is that the risk of fuel failure admittedly has been reduced for the most exposed fuel rods, that is, those located nearest the cruciform centre, but the risk of fuel failure on the other fuel rods is unchanged compared with the risk of fuel failure when using conventional control rods.

SUMMARY OF THE INVENTION

The object of the invention is to achieve a control rod for a nuclear reactor which provides a reduced risk of fuel failure when, from an inserted position for a longer period of time, it is extracted from the reactor core in successive steps.

What characterizes a control rod according to the invention will become clear from the appended claims.

A control rod according to the invention has absorber blades which form an orthogonal cross with a central cruciform centre, the capacity of which to absorb neutrons varies both axially and radially. The capacity of the absorber blades to absorb neutrons is lower in their upper part than in their lower part. In the upper part of the absorber blades, the neutron absorption capacity is higher in its outer part than in its inner part which adjoins the cruciform centre. The control rod according to the invention leads to the power reduction for fuel pellets located adjacent to the upper part of the control rod becoming smaller in relation to fuel pellets which are not controlled with respect to fission velocity with the aid of control rods. Especially those fuel pellets which are located nearest the cruciform centre of the control rod will have a lower power reduction than those fuel pellets which are not controlled with the aid of control rods. When the control rod is extracted somewhat, and the fuel pellets which have been protected by the upper part of the control rod are exposed, the power increase in these fuel pellets will be smaller than for prior art control rods, which is due to the fuel pellets already being burnt up to a certain extent.

One advantage of a control rod according to the invention is that the risk of fuel failure on the cladding tube in connection with the control rod being extracted is reduced. Another advantage is that the utilization of the fuel becomes more efficient. An additional advantage is that longer service lives of the control rods are made possible.

In a control rod according to the invention, each one of the absorber blades comprises an upper and a lower part, the mean value of the contents of absorber material per unit of length of the control rod being smaller in the upper part of the control rod than in the lower part thereof. The upper part comprises an outer part provided with absorber material and an inner part which lacks absorber material and which is arranged radiallly inside the outer part.

To achieve the advantages of the invention, at least some portion of the above-mentioned inner part should constitute at least one-fourth of the width of the absorber blade in the radial direction. In an especially advantageous embodiment, at least some portion of the above-mentioned inner part should constitute at least one-third of the width of the absorber blade in the radial direction. The area, in a section across the longitudinal direction of the control rod, of the above-mentioned inner part should be at least 25% of the area of the upper part. In an especially advantageous embodiment, the area, in a section across the longitudinal direction of the control rod, of the above-mentioned inner part should be at least 30% of the area of the upper part. The length of the upper part should not exceed one-third of the total length of the absorber blade.

In a preferred embodiment of the invention, recesses in the form of through-holes are arranged in the inner central parts of the upper part of the control rod. This implies that more neutron moderator is supplied to the upper central part of the control rod, which further increases the burnup of fissile material in the fuel rods which are arranged nearest the cruciform centre of the control rod.

DESCRIPTION OF THE PREFERRED EMBODIMENTS

Figure 1:
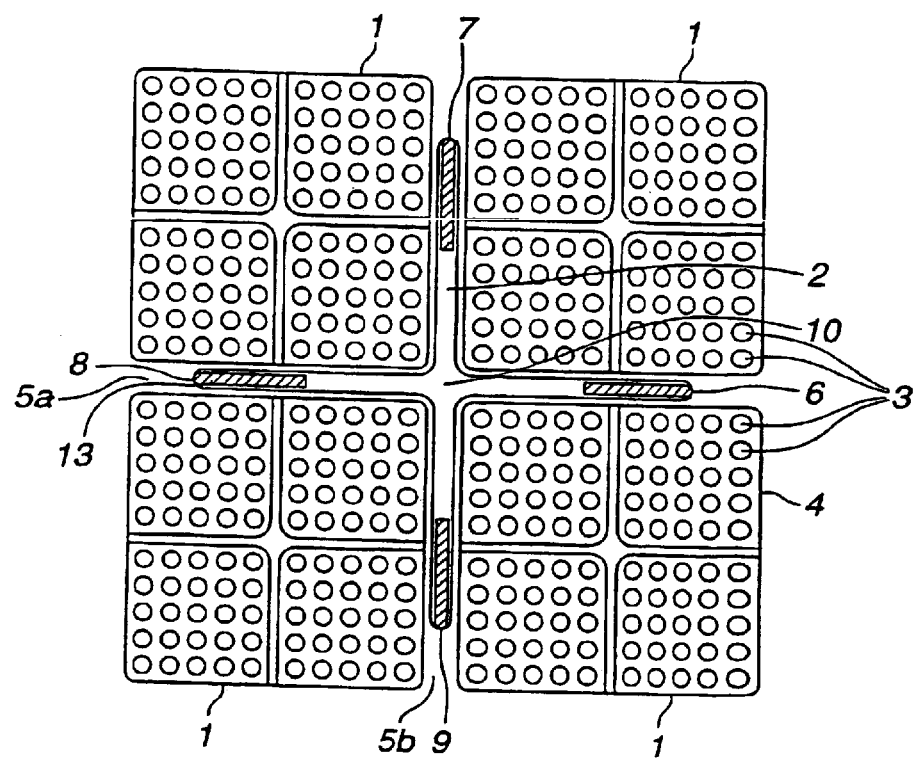
FIG. 1 shows, in a horizontal section, a small part of a reactor core of a boiling water reactor, more specifically a cross section through four fuel assemblies with a control rod placed centrally therebetween.

FIG. 1 shows a horizontal section through four fuel assemblies 1 with an associated control rod 2 placed therebetween. The section is laid through the upper part of the control rod 2. Each fuel assembly 1 comprises 10×10 fuel rods 3. The fuel rods 3 are enclosed in a fuel channel 4 with a square cross section. Each fuel rod 3 comprises a number of fuel pellets of uranium dioxide stacked on top of each other and enclosed in a cladding tube. The spaces between the fuel rods 3 in the fuel assembly 1 is traversed by water which constitutes both coolant and moderator. Between the fuel assemblies 1, gaps 5a and 5b are formed which are traversed by water. The control rod 2 is inserted into the gaps 5a and 5b and has four absorber blades 6, 7, 8, 9 which form an orthogonal cross. The cruciform centre of the control rod is designated 10.

Figure 2A:
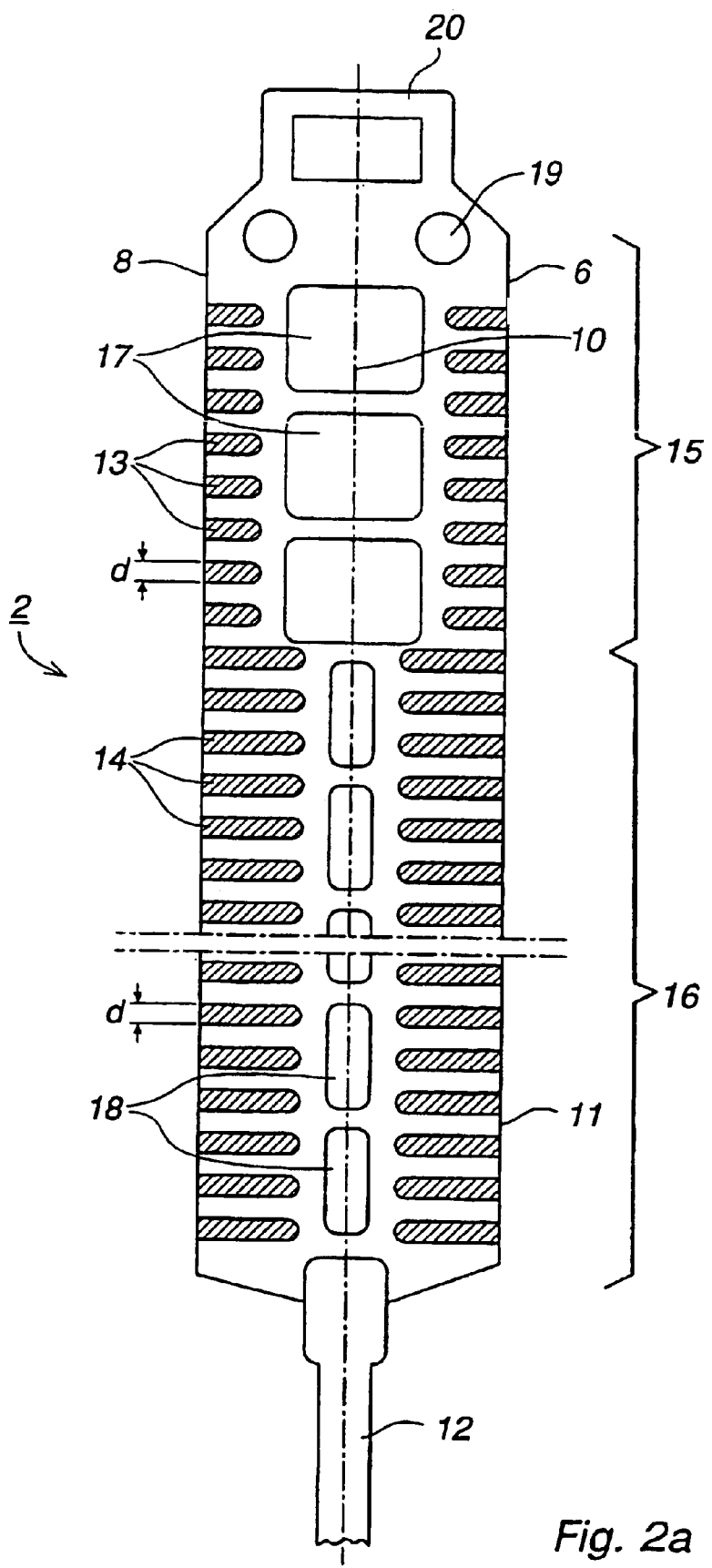
FIGS. 2a–2d show, in vertical sections, different embodiments of a control rod according to the invention.

FIG. 2a shows a vertical section through a control rod 2 according to the invention. The control rod 2 is substantially made of stainless steel and comprises an absorber part 11, which is supported by a vertical coupling bar 12. The control rod 2 comprises an upper part 15 and a lower part 16. The length of the upper part constitutes at most one-third of the total length of the absorber part 11. Two of the four absorber blades 6 and 8 are visible in FIG. 2a. Each one of the absorber blades 6, 8 is provided with a large number of bored channels 13, 14 extending perpendicularly to the longitudinal direction of the control rod 2, from the outer edge of the absorber blade 6, 8 and towards the cruciform centre 10. Each channel 13, 14 is filled with an absorber material, for example natural or enriched boron carbide and/or metallic hafnium, gadolinium or erbium, and is hermetically sealed outwards by means of, for example, welding. In the following, these channels will be referred to as absorber channels. The absorber channels 13 which are arranged in the upper part 15 of the absorber blades are considerably shorter than the absorber channels 14 which are arranged in the lower part 16 of the absorber blades. The absorber channels 13 are arranged in an outer part, disposed radially outside an inner part, of the upper part 15 of the absorber blade. The absorber channels 13 each have a length which is at least 30% shorter than the length of one of the absorber channels 14 in the lower part 16.

The absorber channels 13, 14 in the upper part 15 and in the lower part 16 of the absorber blades, respectively, are preferably circularly cylindrical in shape and all have the same diameters d. To obtain a maximum service life, the diameters d of the absorber channels 13, 14 should be the largest possible taking into consideration the thickness of the material of the absorber blades. The service life of the absorber material depends on the quantity of absorber material per unit of surface, described under the background art above. On the other hand, a halving of the length of the absorber channel with a retained diameter d only has a marginal effect on the service life. In this way, the service life of the control rod is retained in spite of the fact that the percentage of absorber material is reduced in its upper part.

That part of the absorber material which is located inside the absorber channels 13, 14 is provided with recesses 17, 18 in the form of through-holes. In the upper part 15 of the control rod, the recesses 17 are considerably wider in the radial direction than the recesses 18 in the lower part 16 of the control rod. All the recesses have the same extent in the axial direction. It is their respective radial extent that varies. The recesses 17 in the upper part 15 are equally large. When the control rod 2 is inserted into the core, the recesses 17, 18 are filled with moderator, whereby the burnup—due to the good moderation—increases further for the fuel pellets which are to be exposed the next time the control rod 2 is to be extracted somewhat. For guiding the control rod 2 in the relatively narrow gaps 5a, 5b between the fuel assemblies 1, it is provided on top with guide pads 19 in the form of bulges extending outwards from the blade. In addition, the control rod 2 is provided with a handle 20 for handling the control rod during installation and replacement.

Figure 2B:
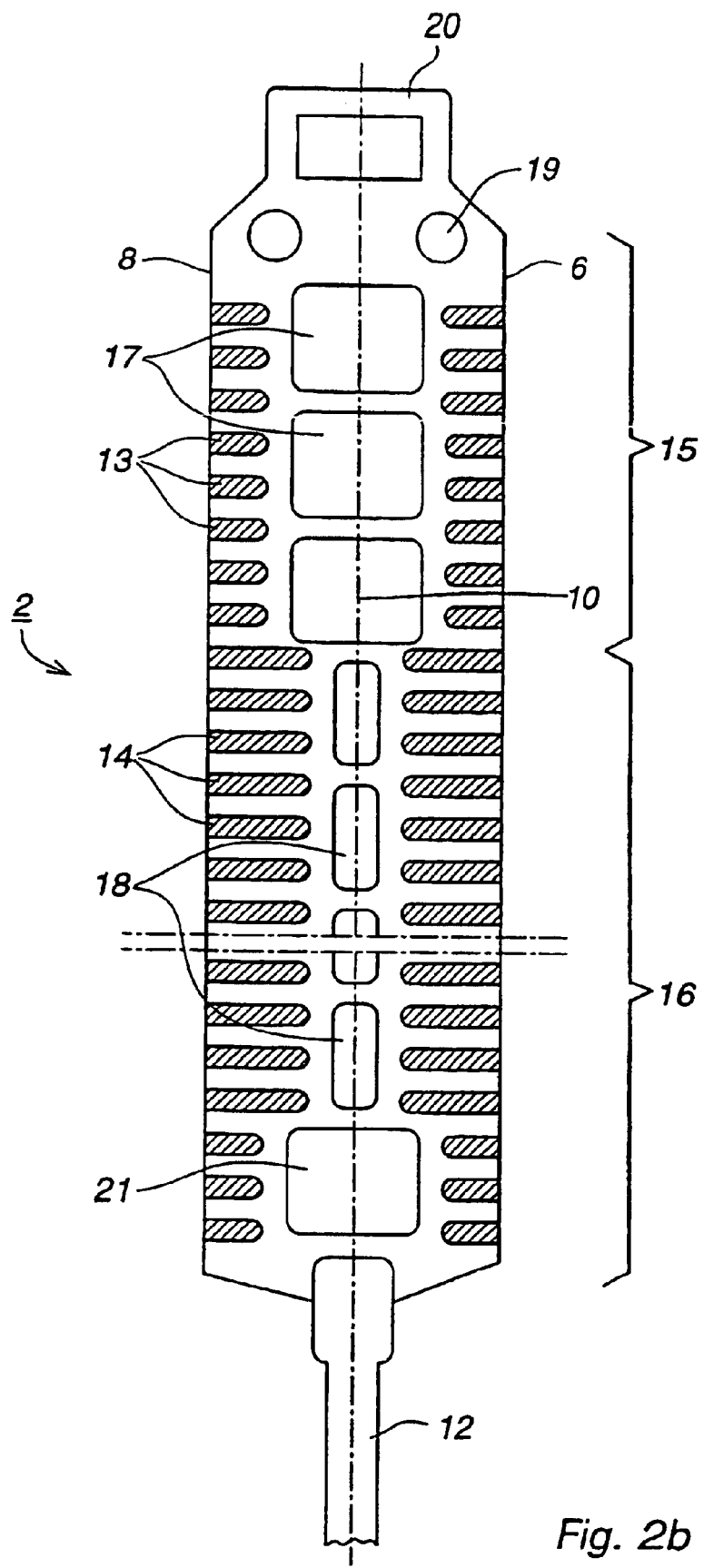

The only thing that distinguishes the control rod 2 in FIG. 2b from that in FIG. 2a is that in the lower part 16, in the vicinity of the coupling bar 12, a recess 21 is arranged which is considerably wider in the radial direction than the other recesses 18 in the lower part 16 and the absorber channels 14 which have been made correspondingly shorter. One advantage of this embodiment is that a certain increased burnup of the fuel rods 3 nearest the cruciform centre 10 of the control rod 2 is achieved as long as the control rod 2 is fully inserted. Another advantage of this embodiment is that the need of reactivity control in the area around the recess 21 decreases since the core normally has a blanket ion, that is, a region with uranium with low enrichment, at the bottom. An additional advantage with this embodiment is that the saved weight of the control rod 2 may be used for placing more absorber material in a part of the control rod 2 where it is better utilized. The latter is of more importance when a heavy absorber material, such as hafnium, is used.

Figure 2C:
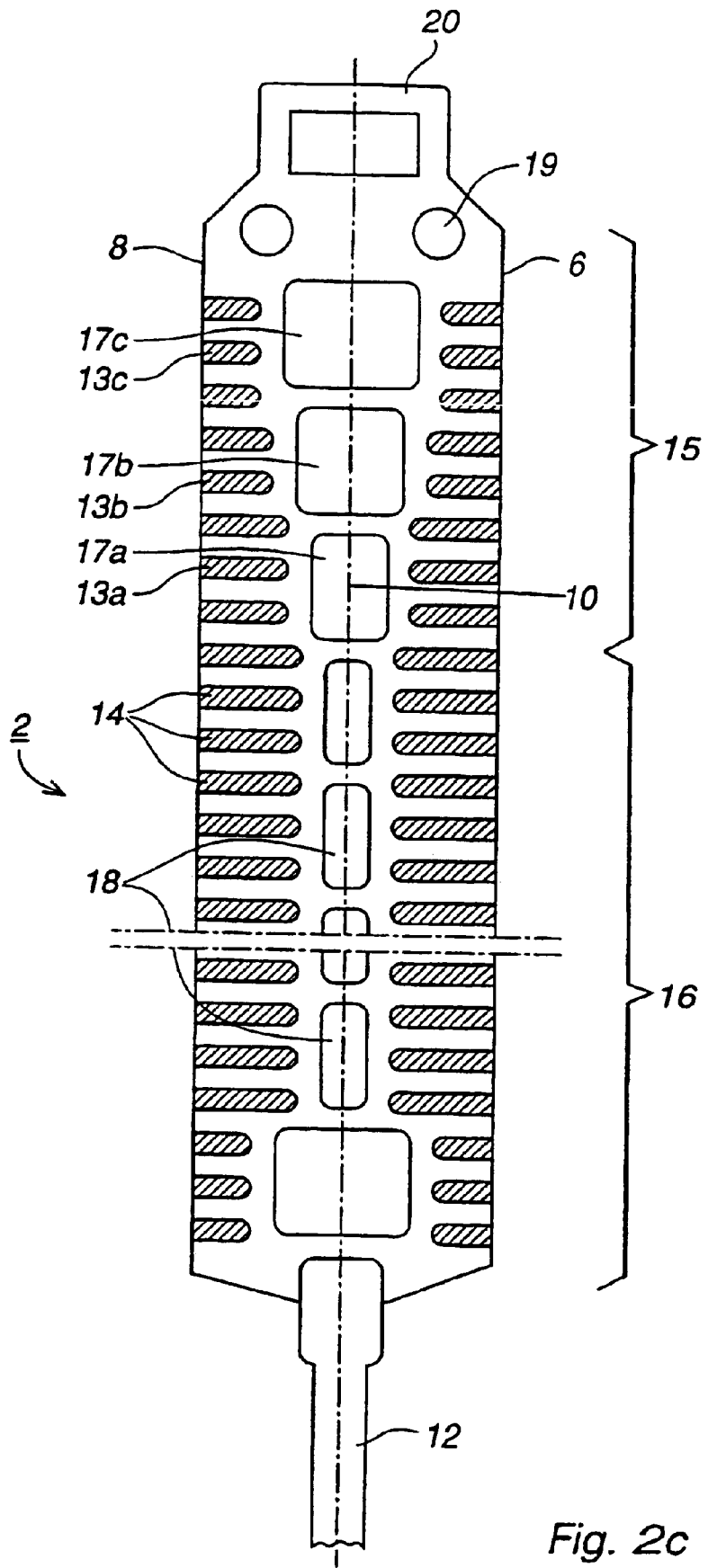

FIG. 2c shows an embodiment of the invention where the recesses 17a, 17b, 17c in the upper part 15 of the control rod successively increase in width and the absorber channels 13a, 13b, 13c successively decrease in length the closer to the top of the control rod that they are arranged. The advantage of the absorber content successively decreasing towards the top of the control rod is that this gives a gradual and more ideal increase of the load on the fuel pellets when the control rod is extracted. The disadvantage of this embodiment is that it is more complicated to manufacture in comparison with the embodiments mentioned above.

Figure 2D:
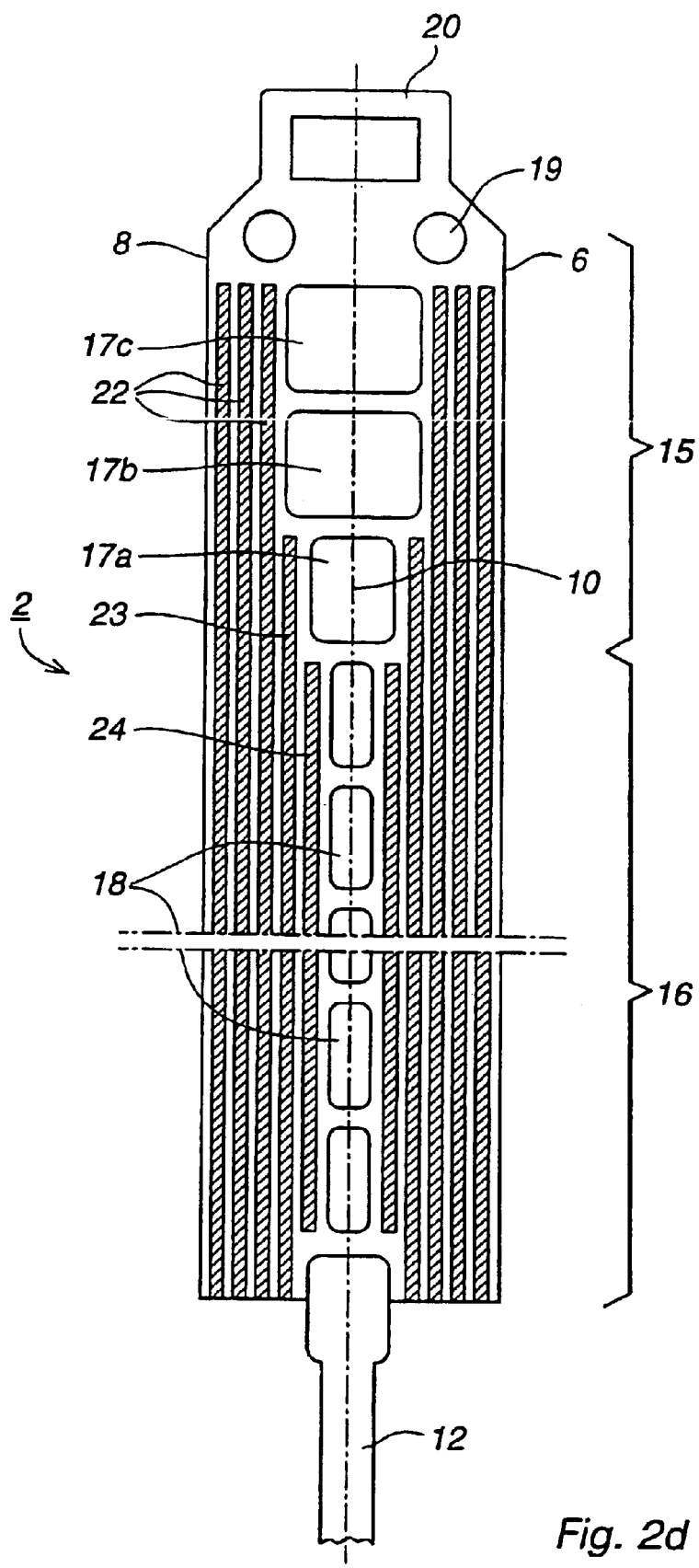

FIG. 2d shows a control rod 2 where each one of the absorber blades 6, 8 is provided with a large number of channels 22, 23, 24 extending in the longitudinal direction of the control rod from the lower part and up towards the upper part of the control rod 2. The cooling channels 22, 23, 24 are filled with an absorber material. A number of channels 22 are arranged in the outer part of the respective absorber blades 6, 8 and extend along the active length of the control rod. One or more channels 23, 24 are arranged nearest the cruciform centre 10 and are shorter than the channels 22 in the outer part of the respective absorber blades. In the upper part 15, recesses 17a, 17b, 17c are arranged which are wider than the recesses 18 which are arranged in the lower part 16 of the control rod. The channels 23, 24 nearest the cruciform centre 10 terminate below the wider recesses 17a, 17b, 17c and possibly above the attachment of the coupling bar 12. The absorber channels 22, 23 and 24 are preferably circularly cylindrical in shape and all have the same diameter d.

The control rod 2 according to the invention is suitable to use as a complement to conventional control rods. The control rod according to the invention is especially suitable to use as a controlling rod, for control of reactor power and for burnup compensation (cf. the description under the background art). During a considerable part of the operating cycle, the controlling rods are inserted into the core. To attain the above-mentioned advantages of the invention compared with a conventional control rod, that is, reduced risk of fuel failure on the cladding tube, better utilization of fuel and longer service life of the control rod, it may be sufficient with a small number of control rods according to the invention, for example 4, 8, 12 or 16, depending on the size of the core and the manner of utilizing the control rods. The shutdown margin of a reactor, that is, the inherent negative reactivity of the reactor which causes it to be safely shut down, is deteriorated by control rods which are inserted into the core during operation. Since only a small number of the control rods in the core are of a type according to the invention, the deterioration of the shutdown margin becomes small.

What is claimed is:

1. A control rod for a boiling water reactor, comprising:
   four absorber blades forming an orthogonal cross with a cruciform centre, the absorber blades having a width in a radial direction of the control rod and a length in a longitudinal direction of the control rod, wherein each absorber blade comprises a neutron-absorber material distributed along its length, wherein the control rod comprises an upper part and lower part that comprise a whole length portion of the control rod that is provided with the neutron-absorber material, wherein a mean value of a quantity of absorber material per unit of length of the control rod is smaller in the upper part of the control rod than in the lower part, wherein the upper part of each absorber blade comprises an inner part and an outer part, wherein the inner part is arranged radially inside the outer part, wherein the outer part is provided with the neutron-absorber material whereas the inner part lacks neutron-absorber material, wherein the inner part, in at least some portion of the upper part, comprises at least one-fourth of the width of the absorber blade, wherein a first plurality of recesses are arranged in the absorber blade along the cruciform center of the control rod in the inner part of the upper part, wherein a second plurality of recesses are arranged in the absorber blade along the cruciform center of the control rod in the lower part of the control rod, the first and second plurality of recesses being made as throughholes through the absorber blade, wherein the recesses in the upper part are wider than at least a majority of the recesses in the lower part.

2. A control rod according to claim 1, wherein the length of the upper part constitutes at most one-third of the length of the absorber blade.

3. A control rod according to claim 1, wherein said inner part in at least some portion constitutes at least one-third of the width of the absorber blade.

4. A control rod according to claim 1, wherein the absorber blades comprise a plurality of radially arranged channels in which the absorber material is arranged, whereby at least the majority of the channels in the upper part are shorter than the channels in the lower part of the absorber blades.

5. A control rod according to claim 4, wherein the channels in the upper part and the lower part have a diameter of essentially equal size.

6. A control rod according to claim 1, wherein the absorber blades comprise a plurality of channels, arranged axially in relation to the control rod, in which the absorber material is arranged, whereby at least the majority of the channels are arranged radially outside one or more channels which are arranged nearest the cruciform center.

7. A control rod according to claim 6, wherein the channels arranged nearest the cruciform center are shorter than the channels arranged in the outer part of the absorber blades, arranged radially outside said cruciform center.

8. A control rod according to claim 7, wherein the channels arranged nearest the cruciform center and the channels arranged in the outer part of the absorber blades, arranged radially outside said cruciform center, have a diameter of essentially equal size.

9. A control rod according to claim 1, wherein the absorber material consists of boron and/or hafnium.

10. A control rod according to claim 1, wherein the absorber material consists of boron carbide and/or hafnium metal.

11. A control rod, comprising:
four absorber blades forming an orthogonal cross having a cruciform center and having an upper part, a lower part, an inner part proximal to the cruciform center, an outer part distal to the cruciform center, a width in a radial direction of the blade and a length in a longitudinal direction of the blade, wherein neutron absorbing material is arranged in the outer part of each blade and neutron absorbing material is not arranged in at least a portion of the inner upper part of each blade and wherein a mean quantity of absorber material per unit length of the control rod is less in the upper part than in the lower part; and
a plurality of first recesses arranged in the upper part of the blades and a plurality of second recesses arranged in the lower part of the blades, the first and second recesses operative to permit moderator access to the cruciform center to control burn up of fissile material along the length of the absorber blade, the first and second recesses comprising holes extending through the inner portion of the absorber blades and distributed along the absorber blades at the cruciform center, wherein the first recesses are wider than at least a majority of the second recesses.

12. A control rod, comprising:
four absorber blades forming an orthogonal cross having a cruciform center and having an upper part, a lower part, an inner part proximal to the cruciform center, an outer part distal to the cruciform center, a width in a radial direction of the blade and a length in a longitudinal direction of the blade, wherein neutron absorbing material is arranged in the outer part of each blade and neutron absorbing material is not arranged in at least a portion of the inner upper part of each blade and wherein a mean quantity of absorber material per unit length of the control rod is less in the upper part than in the lower part; and
a plurality of recesses arranged in the blades, the recesses being operative to permit moderator access to the cruciform center to control burn up of fissile material along the length of the absorber blade, the plurality of recesses comprising holes extending through the inner portion of the absorber blades and distributed along the absorber blades at the cruciform center, wherein recesses arranged in the upper part of the blades are wider than at least a majority of recesses arranged in the lower part of the blades.

* * * * *